United States Patent
Ingenbleek et al.

(10) Patent No.: US 8,105,204 B2
(45) Date of Patent: Jan. 31, 2012

(54) METHOD AND DEVICE FOR CONTROLLING A FLUID-ACTUATED CONTROL SYSTEM

(75) Inventors: Robert Ingenbleek, Kressbronn (DE); Markus Ulbricht, Tettnang (DE); Mario Steinborn, Friedrichshafen (DE); Armin Brentel, Eriskirch (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 785 days.

(21) Appl. No.: 12/225,899

(22) PCT Filed: Apr. 2, 2007

(86) PCT No.: PCT/EP2007/053137
§ 371 (c)(1),
(2), (4) Date: Oct. 1, 2008

(87) PCT Pub. No.: WO2007/115958
PCT Pub. Date: Oct. 18, 2007

(65) Prior Publication Data
US 2009/0048067 A1 Feb. 19, 2009

(30) Foreign Application Priority Data
Apr. 7, 2006 (DE) .......................... 10 2006 016 412

(51) Int. Cl.
*F16H 61/26* (2006.01)
(52) U.S. Cl. ....................................................... 477/156
(58) Field of Classification Search .................. 477/156, 477/158
See application file for complete search history.

(56) References Cited

U.S. PATENT DOCUMENTS

| | | | |
|---|---|---|---|
| 5,888,170 A * | 3/1999 | Takiguchi et al. | 477/146 |
| 5,997,433 A | 12/1999 | Domian et al. | |
| 6,223,118 B1 | 4/2001 | Kobayashi et al. | |
| 6,390,947 B1 * | 5/2002 | Aoki et al. | 477/3 |
| 2004/0200683 A1 | 10/2004 | Amamiya et al. | |

FOREIGN PATENT DOCUMENTS

| | | |
|---|---|---|
| DE | 196 00 739 A1 | 7/1997 |
| DE | 197 35 759 A1 | 2/1999 |
| DE | 199 22 242 A1 | 12/1999 |
| DE | 100 46 106 C1 | 4/2002 |
| DE | 101 30 232 A1 | 1/2003 |
| DE | 102 59 962 A1 | 7/2004 |
| EP | 0 997 671 A2 | 5/2000 |
| EP | 1 232 901 A2 | 8/2002 |
| EP | 1 386 083 | 2/2004 |
| WO | WO-02/086327 A1 | 10/2002 |
| WO | WO-2004/085885 A1 | 10/2004 |

* cited by examiner

*Primary Examiner* — Edwin A Young
(74) *Attorney, Agent, or Firm* — Davis & Bujold, P.L.L.C.

(57) ABSTRACT

A method and a device for controlling a fluid-actuated control system of an automatic or automated transmission of a motor vehicle, which has at least one pressure medium source, at least two control elements that are actuated by pressurized fluid and a control device for controlling the fluid-actuated control system. A further control module is used to reduce; the number and power consumption of valves that are actuated simultaneously to control the control elements; and the mechanical loading of the control elements (1, 2). The control module reads signals concerning at least one current control action and, in accordance with predetermined patterns, calculation rules and/or models, generates signals that cause non-switched control elements to be manipulated by pressurized working fluid.

13 Claims, 1 Drawing Sheet

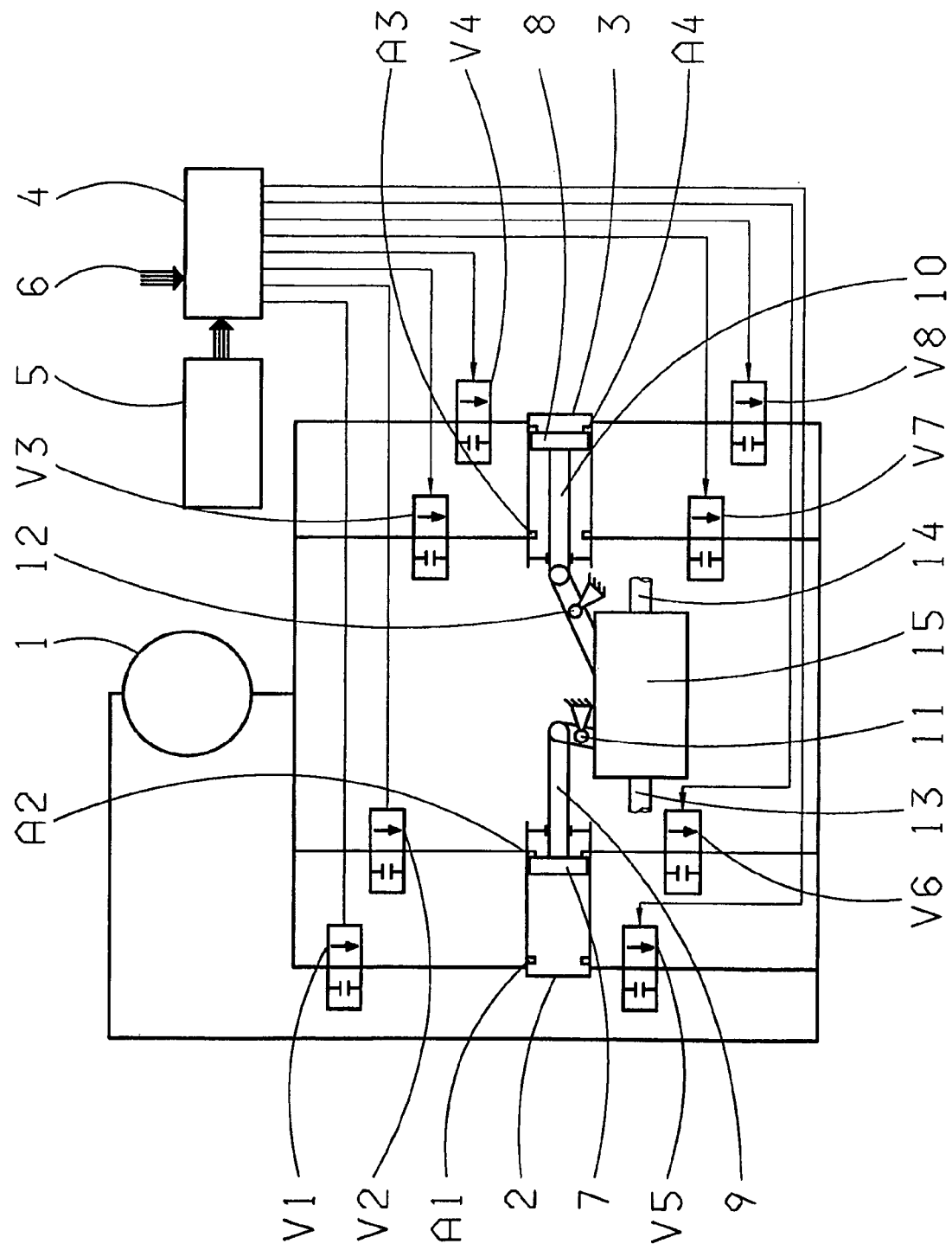

METHOD AND DEVICE FOR CONTROLLING A FLUID-ACTUATED CONTROL SYSTEM

This application is a national stage completion of PCT/EP2007/053137 filed Apr. 2, 2007, which claims priority from German Application Serial No. 10 2006 016 412.1 filed Apr. 7, 2006.

FIELD OF THE INVENTION

The invention concerns a method and device for controlling a fluid-actuated control system, in particular for fixing the position of control elements and a device for implementing the method.

BACKGROUND OF THE INVENTION

Nowadays severe demands are made on fluid-actuated control systems, for brevity also called fluid medium systems in what follows, and particularly on systems of such type designed for automated or automatic transmissions in motor vehicles. Besides special requirements in relation to low weight along with great reliability, long life and low maintenance, in passenger cars in particular vibrations and noise caused by device components of the fluid medium system must be avoided if possible or at least reduced as much as possible. In addition, special requirements exist in relation to the actuation speed of control elements to be actuated, since a traction force interruption caused by a gear change should be as brief as possible. At the same time, the fluid medium system should be as inexpensive as possible to produce and assemble and should consume little energy in operation.

Thus, until now, it has been usual in fluid-actuated transmissions, following a control action, i.e., a change in the position of at least one fluid-actuated control element, to switch off the pressure on the pressure-actuated control element(s) or at least to reduce it to a lower pressure level sufficient to maintain the desired position of the pressure-actuated element(s). This relieves the stress on the pressure medium lines and other pressurized components of the pressure medium system and the control elements, and so enables a reduction of the loading of the entire fluid medium system, which can then correspondingly be designed to be less strong and lighter, and/or to have a longer service life. Furthermore, if the system is subjected to high pressure only when control actions are actually taking place, this has advantages in relation to the electrical energy needed for the actuation of the electrically operated valves that produce the pressure, and advantages in relation to fluid loss rate if there is a leak in the system components concerned.

During a control action, even control elements that are not switched or moved during the control action are generally still acted upon by pressure throughout the entire switching duration, including a post-switching period, in order to prevent or reduce any possible undesired position change and, in this way, they are fixed in their position, secure against any possible unforeseen displacement caused by hardly avoidable local and time-related pressure fluctuations.

In the present document, unless expressly otherwise stated, the term "control action" is understood to mean an action of the fluid-actuated control system in which the position of at least one control element is changed by way of control commands of the control device in such manner that the desired effects are produced on the system to be controlled or regulated. In this context the position of the "control element" is understood to mean the displacement of a movable piston in a cylinder. Several actions that take place simultaneously or at least in close time proximity are regarded as a single control action for these purposes.

Accordingly, the actuation of a control cylinder of a piston-cylinder arrangement whose piston can be coupled to a clutch release lever or a shift claw displacement mechanism or a gearwheel mounted to move on a shaft, constitutes a control action if its result or at least its intention is to produce a desired change in the position of the clutch lining, an engagement or disengagement of the claw clutch, or to bring two gearwheels into mutual engagement. Inasmuch as the closing of the clutch, an engagement of the claw clutch or a displacement of the gearwheel on the shaft, during a gear change, take place virtually simultaneously, these actions can be taken together as a single control action "engage X gear". Control elements which are actuated in correspondence with the above description will be referred to as "switched" control elements in what follows.

In addition, however, the term "control action" should also be understood to mean cases in which a control element is actuated in order to fix one or more control elements in their position. "Fixing" of a control element is understood to mean that it is acted upon with the aim of keeping its position unchanged, or holding it fixed in its position or, if need be, moving it a certain distance in the direction toward a position it occupied before or one that is desired for it. The distance being substantially smaller than the distance between adjacent functional positions of the control element. Such cases include the action of pressure by control elements intended to bring a piston that has bounced back a short way back into contact with an abutment.

For example, a sensor can determine that a movable control-element piston has moved away from its intended position because of vibrations or external forces, or would be so moved unless this is counteracted by the corresponding action of pressure by a pressurized working fluid. Control elements, which are actuated in accordance with the above description, will be referred to as "non-switched" or "unswitched" control elements in what follows.

In the context of a fluid medium system with several control elements, it has until now sometimes been deemed advantageous, when a control action is to be carried out to apply a specified pressure to the pressure system as a whole by way of a main valve for a standardized time interval consisting of a positioning time and a post-switching time, whereby if the valves associated with the control elements are set in advance or at the same time, the switched control element(s) or their moving parts are brought to the desired position while the un-switched control elements or their moving parts are held fixed in their positions by the action of the pressure.

Often, however, the control elements are connected, via control valves fitted near them, to a pressure medium delivery line that is constantly under a standardized operating pressure during operation and to a pressure medium outflow line which is under lower pressure or unpressurized so that, to actuate a control element for example by the action of valves, this control element is exposed selectively to the operating pressure for a standardized time. In such cases, all the valves associated with the non-switched control elements as well are actuated correspondingly, in order to fix those control elements in their position. In the case of pneumatic systems, of course, the pressure medium outflow line can be replaced by a simple venting option to the surroundings.

Although the pressurization even of non-switched control elements as described is basically reasonable and makes a substantial contribution to the functional reliability of the system, this procedure in the form so far applied is associated with the disadvantages described below.

Because of the simultaneous or at least almost simultaneous pressurization of all the switched and un-switched control elements with fluid under pressure, the fluid flow required for a short time is relatively large. This is particularly the case in pneumatic fluid systems and in hydraulic fluid medium systems as well although to a lesser extent.

Because of the different dead times of valves and control elements and the different geometries of the various fluid lines, there may be a small time-spread of the moments of action, but this is very slight and, as a so-termed "dirt effect", requires no means for the optimization of the fluid medium system directed against it.

As a direct result of this, it is either necessary to provide a relatively bulky and heavy reservoir container for a working fluid under high pressure or the pressure medium source must be in the form of a pressure medium pump designed to have correspondingly high power. Both variations result in increased weight and higher costs.

Even if an appropriate reservoir container is, in any case, provided, for example on account of safety considerations, related to an emergency running ability of the fluid medium system in the event of a failure of the pressure medium pump, the pressure medium lines to the individual control elements and, in particular main pressure medium lines for the supply of several control elements, must be designed large enough so that they generate only an acceptably low flow resistance against the necessary large fluid medium flows. This increases the necessary cross-sections and leads to limitations in relation to the positioning of the pressure medium lines, for example in a motor vehicle with limited free space and many restrictive conditions for the way these lines run.

A problem similar to the problem of the large pressure medium flow required for a short time as outlined above, concerns the electrical control of the valves associated with the control elements. Since these have to be actuated simultaneously to the positions desired in each case, then when the valves have an approximately equal dead time it follows that they must also receive actuating signals simultaneously. With the electrically actuated valves used customarily this results in a substantial power peak of the electrical consumption which can interfere with other sensitive systems unless counteracted by elaborate measures. Moreover, simultaneous energizing of the valves means that at least some of the valves are operated for an unnecessarily long time, which wastes energy and increases the loading of the valve.

The simultaneous action on all the control elements with fluid under pressure also produces a comparatively large pressure pulse in the system, which not only substantially stresses all the pressure delivery elements of the fluid medium system, but can also result in mechanical vibrations and/or excitation of the system or parts of it into resonant oscillations. Furthermore, there may be noise emissions which are undesirable precisely in the context of motor vehicles and in particular passenger cars.

Against this background, the purpose of the present invention is to propose a control method for a fluid medium system, for example an automated or automatic transmission of a motor vehicle, which does not suffer from the disadvantages outlined above or at least only so to a considerably lesser extent. In particular, it must be possible to fix the shift elements according to need and only for a short time.

SUMMARY OF THE INVENTION

The invention is based on the recognition that the above-mentioned disadvantages can be eliminated or at least greatly reduced by a timed, brief and need-orientated pressurization of non-switched control elements.

Accordingly, the invention begins with a method for controlling a fluid-actuated control system, for example controlling a hydraulically or pneumatically controlled automatic or automated transmission of a motor vehicle. The fluid-actuated control system comprises at least one pressure source or pressure medium source and at least two control elements that can be acted upon by pressurized fluid, as well as a device for controlling the fluid-actuated control system.

In this context, a "fluid-actuated control system" is understood to mean a hydraulic or pneumatic system which, with the help of valves that can be actuated electrically, for example by a control device, is selectively able to actuate control elements and bring them to a desired position or keep them there.

To achieve the declared objective, it is provided that an additional control module reads in signals concerning at least the control action in progress and from them, in accordance with predetermined patterns and/or calculation rules and/or models, generates signals that enable non-switched control elements to be acted upon by a working fluid under pressure. This of course means a pressure that differs from a reference pressure and is suitable for the fixing of the control elements.

This explicitly excludes the trivial case that the control module is identical to a conventional control device of the fluid-actuated control system and that for any control action the pattern consists in always acting upon all, or at least most of the non-switched control elements, with a working fluid under pressure.

Compared with the methods of the prior art, the method makes it possible, in the case of a hydraulically controlled motor vehicle transmission, to regard gear change processes or their part-steps as control actions and for every possible gear change, besides the control elements that have to be switched in each case, also to maintain in position any un-switched control elements that might inadvertently move to another position during the course of the gear change. In this example, control elements, for which there is no such risk, are not acted upon by pressure and the pressure pulse so that the pressure pulse, the maximum volume flow occurring and the electric peak load, required for actuating the control elements, are all correspondingly reduced.

Besides this actuation pattern resembling a table, it is also possible, in addition, to impose pressure on any non-switched control element which has not been pressurized during the past, for example two control actions, in order to prevent any gradual drifting of the position of the moving parts of the control element concerned.

In a first preferred embodiment of the invention, it is provided that the control module generates signals, which contain information about at least the non-switched control element(s) to be pressurized and the time when they are acted upon by working fluid under pressure, or which bring about those control operations directly by way of suitable signals.

In this way, for non-switched control elements that have to be pressurized the start times of the pressurization can be chosen differently so that by an appropriate choice of the times the maximum volume flow in the system can be reduced considerably and also stabilized. The same also applies to the peak electric load required by the valves to be operated, since the switching peaks can be distributed over time. It is also possible to distribute the pressurization start times over a longer period and thus, for example if the duration of pressurizing for individual control elements is standardized, to act upon them sequentially in time, at least in part.

In relation to the concept of the invention, of course it makes no difference whether the control module sends the corresponding signals to the valves of the control elements directly, or if necessary, via intermediate signal amplification means, or transmits a report with the corresponding data, perhaps by way of a protocol to the control device, which then correspondingly takes the data in to account and, for its part, takes on or authorizes the actuation of the valves.

In a second preferred embodiment of the invention, the control module generates signals which contain information about at least the non-switched control element(s) to be pressurized and the duration of their pressurization with working fluid under pressure or which bring about those control operations directly by way of suitable signals.

Thanks to the possibility of determining the duration of pressurization, on the one hand, the pressurization duration of non-switched control elements can be minimized more or less according to structure or function and, on the other hand, a further gradation and purpose-orientated time distribution of the pressurizing of the non-switched control elements is made possible. In this connection, the specification of a pressurization start time and end time amounts, of course, to the specification of a time duration.

What the above means, of course, is that different time periods are specified for different control elements and/or different control actions and/or on account of other parameters. The trivial case of a specification, always of the same duration for all the control elements, is expressly not intended.

According to a further development of the method, if the control module additionally reads in further information from sources external or internal to itself and takes that information into account for determining the non-switched control elements to be pressurized and/or the time and/or the duration of their pressurization, further advantageous possibilities are made available.

For example, as a function of error conditions of a control element that have occurred in the past, if owing to aging the moving parts of the control element have a tendency to drift out of position, the frequency of pressurization can be increased or the temperature of the working fluid and hence the ease of movement of the control element can be taken into account. Other information that can be taken into account particularly usefully and the respective possibilities arising therefrom are described briefly below.

According to a first variation, if the control module additionally reads in information about the priority for maintaining or holding the position of a control element fixed and takes it into account when determining the non-switched control elements to be pressurized and/or the timing and/or the duration of their pressurization, this enables prioritized pressurization of any non-switched control elements whose position is particularly critical during the subsequent course of the control action, because a wrong position could lead to clashing between different components in the transmission.

A second variation provides that the control module reads in information about the availability of electrical energy and takes it into account when determining the non-switched control elements to be pressurized and/or the timing and/or duration of their pressurization.

This makes it possible in the event of a voltage interruption, for example in the case of a temporary overload of the main electrical system or a low charge level of a battery, either selectively to forego the pressurizing of certain non-switched control elements or to curtail the duration thereof.

If the additional information read in by the control module and taken into account when determining the non-switched control elements to be pressurized and/or the timing and/or duration of their pressurization with working fluid under pressure includes information about the availability of a working fluid pressure and/or a volume flow, then in this respect too any difficulties that occur or seem likely can be acutely or anticipatorily mitigated or at least taken into account.

According to a further variation, if the control module additionally reads in information about the IST-position (actual position} of a non-switched control element and takes it into account when determining the control elements to be pressurized and/or the timing and/or duration of their pressurization, then the pressurizing of non-switched control elements can be optimized still further.

If there is any discrepancy between the IST- and the SOLL-position (actual and nominal position), conclusions can be drawn about the drift tendency of the moving parts of a control element, i.e., about its tendency to change its position other than under control. In such a case, the frequency with which this control element, when it is not being actuated, is pressurized and thus restored to its SOLL-position (nominal position) can be increased. If the difference between the SOLL-position (nominal position) and the determined IST-position (actual position) persists, the pressurization can be made longer so as to be sure of reaching the desired position. Pressurization can also be shortened to a minimum time so that it is discontinued when the target position has been reached.

It is also possible to generate and emit an error warning, or to make the pressurizing of a non-switched control element dependent in advance on whether a specified difference between an IST-position and a SOLL-position (actual and nominal position) has been reached or exceeded. This last procedure is particularly appropriate for the cases described earlier, of an acute shortfall of electrical energy, pressure or pressure medium volume flow.

However, knowledge of the IST-position (actual position) of the moving parts of a control element is expedient not only in relation to a known SOLL-position (nominal position), but can furthermore be used to determine a reaction speed of switched control elements or a drift rate or vibration of non-switched control elements.

A further development of this variation provides that when information comes in about a discrepancy between an IST- and a SOLL-position (actual and nominal position) of the moving part of a control element, the control module initiates a control action. For example, if a position deviation of a control element is detected by comparing the IST- and SOLL-positions (actual and nominal position), the control action initiated by the control module can be such that just the control element concerned is brought back to its nominal position. So if, for example, an evaluation of position data over time reveals that the moving part of a control element is vibrating undesirably strongly, then the control action can provide that until a desired position change has taken place this control element is permanently pressurized to hold it securely fixed in its nominal position.

Finally, it can be advantageous if the control module generates signals that result in pulsed pressurization of non-switched control elements with working fluid under pressure since, for example in the case of a slightly sticking piston of a control element in the form of a piston-cylinder arrangement or a piston whose movement is not easy, this pulsing can more easily overcome the static friction that leads to sticking.

A device which is suitable for implementing the method according to the invention will be described briefly below.

This device comprises a fluid-actuated control system having at least one pressure medium source for putting a working fluid under high pressure and at least two control elements that can be actuated with the aid of the working fluid under high pressure. In addition, a control device is provided for the actuation of valves to control and/or regulate the pressure in various parts of the fluid-actuated control system.

To implement the method in accordance with at least one of its variations and further developments described above, the device also comprises a control module designed so that it can read in at least one datum concerning a current control action, and by additionally taking into account predetermined patterns, calculation rules and/or models, can generate signals that result in the pressurizing of non-switched control elements with working fluid under pressure.

In this context, a current control action is understood to mean either a control action that has already been initiated, which can be recognized by the control module by way of sensors or a control action that is imminent in the very near future or planned, or to be prepared for, concerning the imminence of which the control module can be alerted by the control device or by signals such as ones from a gear selector switch.

The signaling interconnection between the control device and the control module need not be elaborate. For example, via a data or control line, the control device can send a signal about a control action to the control module, which determines the non-switched control elements to be pressurized and the time points and durations of their pressurization, and sends this information back to the control device for further processing, signal amplification and actuation of the corresponding valves. However, it is also conceivable for the control module itself to actuate the appropriate valves directly or via other means.

The control module can be integrated in the control device structurally and in terms of software, it can be an independent unit, or it can be integrated entirely or partially in other units or modules. Here too it makes no difference whether models, calculation rules or other patterns, which can also be based on fuzzy logic or self-teaching pattern-recognition methods, are stored in the control module itself or read in from outside. Finally, it is obvious that the control module can have other inputs and outputs for the supply of electrical energy, sensor signals, error messages and other information. A design of the signal-related input and output sections that has bus-type capabilities is appropriate here.

The fluid-actuated control system can be a hydraulic system. This is advantageous mainly in relation to the avoidance of overlapping pressure pulses because of the incompressibility of the hydraulic working fluid. Alternatively, the fluid-actuated system can be a pneumatic system, which can be advantageous particularly in relation to the avoidance of resonance oscillations because of the compressibility of the working medium.

BRIEF DESCRIPTION OF THE DRAWINGS

The invention will now be described, by way of example, with reference to the accompanying drawings in which:

The sole FIGURE shows a fluid-actuated control system.

DETAILED DESCRIPTION OF THE INVENTION

Accordingly, the sole FIGURE shows a fluid-actuated control system consisting of a pressure medium source 1, in this case in the form of a pressure medium pump, two control elements 2 and 3, and a respective pressure inlet and pressure outflow lines to and from the valve V1 to V8 that control the pressure medium source 1, which are actuated electrically by a control module 4. This control module 4 contains information about control actions together with associated control data for the control elements 2 and 3 to be actuated by a conventional control device 5.

The control elements 2 and 3 are each in the form of piston-cylinder arrangements and each comprises a movable piston 7 and 8 respectively, which can move between abutments A1 and A2 or A3 and A4 in the respective cylinders. The movable pistons 7 and 8 are connected by piston rods 9 and 10 and in each case a thrust deflection device 11 and 12 respectively, to elements of an automated transmission 15 which, when they are actuated, bring about a change of the transmission ratio between an input shaft 13 and a drive output shaft 14 of the transmission 15.

Whereas the control data for the valves to be actuated that pertain to a switched control element are, if necessary, separated into individual signals and amplified for output to the valves V1 to V8 to be actuated by the control module 4, i.e., in essence only passing through the control module 4, on the basis of information contained by the control unit 5 and further data or signals 6 from electronic equipment and/or sensors and with the help of calculation rules, models or, in the simplest case, a table, the control module determines for the non-switched control elements 2 or 3 whether and, if necessary, when and for how long these should be fixed in position by appropriate actuation of the associated valves V1 to V8 in an actuating direction.

Let it be assumed that on the basis of data available to it, the control device 5 initiates a change of the transmission ratio between the input shaft 13 and the output shaft 14 of then automated transmission 15 and that to do this the control element 2 must be actuated so that its movable piston 7 is displaced from the starting position shown, in contact with the abutment A2 to a target position in contact with the abutment A1.

The control device 5 assembles these data for the forthcoming control action and transmits them to the control module 4. The latter recognizes the forthcoming control action and determines whether and, if necessary, which non-switched control element, in this case control element 3, has to be fixed in its position. Let it be assumed that the piston 8 of control element 3 tends to be inadvertently displaced during the control action and must therefore be fixed or held in its position in contact with the abutment A4 for a sufficient time by a corresponding pressurization.

With the help of calculation rules, in this case stored within the control module and a table, the control module 4 now determines the point in time and the duration for the actuation of valves V3, V4, V7 and V8 of the—in this case—non-switched control element 3 and actuates the valves V1 to V8 in accordance with the data specified by the control device 5 and determined by the control module 4. Thereby, the piston 8 of control element 3 is maintained securely against the abutment A4 whereas the piston 7 of control element 2 is pushed from abutment A2 to abutment A1.

REFERENCE NUMERALS 1 pressure medium source, pump
2 first control element
3 second control element
4 control module
5 conventional control device
6 further signals, inputs or outputs of the control module
7 piston of the first control element 8 piston of the second control element
9 piston rod of the first control element
10 piston rod of the second control element
11 deflection device of the piston rod of the first control element
12 deflection device of the piston rod of the second control element
13 input shaft of the automated transmission
14 output shaft of the automated transmission
15 automated transmission.
V1-V8 valves
A1-A4 abutments of the movable pistons of the control elements

The invention claimed is:

1. A method for controlling a fluid-actuated control system of a motor vehicle, with at least one pressure medium source (1), at least two control elements (2, 3) that are acted upon by fluid under pressure, and a control device (5) for controlling the fluid-actuated control system, the method comprising the steps of:
reading signals with an additional control module (4), the signals concerning at least one current control action,
generating further signals in accordance with at least one of predetermined patterns, calculation rules and models, and
causing non-switched control elements (2, 3) to be acted upon by a pressurized working fluid depending on the further signals generated.

2. The method according to claim 1, further comprising the step of generating further signals with the control module (4) that contain information about at least one of the non-switched control elements (2, 3) to be acted upon by pressure and information relating to timing of their pressurization and directly initiating control measures by way of suitable signals.

3. The method according to claim 1, further comprising the step of generating signals containing information about at least the non-switched control elements (2, 3) to be pressurized and a duration of their pressurization, or brings about such control measures directly by way of suitable signals.

4. The method according to claim 1, further comprising the step of additionally reading in and taking into account, with the control module (4), further information (6) when determining at least one of the non-switched control elements (2, 3) to be pressurized, the timing and the duration of their pressurization.

5. The method according to claim 4, further comprising the step of additionally reading in and taking into account, with the control module (4), further information (6) about priority for maintaining a position of a control element (2, 3) when determining at least one of the non-switched control elements (2, 3) to be pressurized, the timing and the duration of their pressurization.

6. The method according to claim 4, further comprising the step of additionally reading in and taking into account, with the control module (4), further information (6) about availability of electrical energy when determining at least one of the non-switched control elements (2, 3) to be pressurized, the timing and the duration of their pressurization.

7. The method according to claim 4, further comprising the step of additionally reading in and taking into account, with the control module (4), further information (6) about at least one of pressure and volume flow of the working fluid when determining at least one of the non-switched control elements (2, 3) to be pressurized, the timing and the duration of their pressurization.

8. The method according to claim 4, further comprising the step of additionally reading in and taking into account, with the control module (4), further information (6) about an actual position of at least one of the control elements (2, 3) when determining at least one of the non-switched control elements (2, 3) to be pressurized, the timing and the duration of their pressurization.

9. The method according to claim 8, further comprising the step initiating corrective action with the control module (4) when informed about a discrepancy between the actual position and a nominal position of the non-switched control element (2, 3).

10. The method according to claim 1, further comprising the step of the generating signals with control module (4) that result in pulsed action upon the non-switched control elements (2, 3) by pressurized working fluid.

11. A fluid-actuated system comprising at least one pressure medium source (1) for pressurizing a working fluid, at least two control elements (2, 3) that are controlled by the pressurized working fluid, a control device (5) for actuating valves (V1 to V8) and controlling and regulating pressure in various parts of the fluid-actuated control system, and a control module (4) that it receives at least one datum concerning a current control action and generates signals depending on at least one of predetermined patterns, calculation rules and models, the signals result in action being taken upon non-switched control elements by the pressurized working fluid.

12. The fluid-actuated control system according to claim 11, wherein the fluid-actuated control system is one of a hydraulic system and a pneumatic system.

13. The fluid-actuated control system according to claim 11, wherein the control module (4) is connected via a data or control line to the control device (5) and via further data and sensor lines to other electronic equipment or sensors to convey information about a current control action.

* * * * *